US008238529B1

(12) United States Patent
Moore et al.

(10) Patent No.: US 8,238,529 B1
(45) Date of Patent: Aug. 7, 2012

(54) SYSTEM APPARATUS AND METHOD FOR APPLYING VOICE MAIL SHORT CODES IN A BROADCAST MESSAGE SYSTEM

(75) Inventors: Joe Harley Moore, Swansea, IL (US); John William Lindemann, III, St. Louis, MO (US); Aida Hadzisabic, St. Louis, MO (US)

(73) Assignee: Groupcast, LLC, St. Louis, MO (US)

( * ) Notice: Subject to any disclaimer, the term of this patent is extended or adjusted under 35 U.S.C. 154(b) by 439 days.

(21) Appl. No.: 12/627,854

(22) Filed: Nov. 30, 2009

(51) Int. Cl.
*H04M 1/64* (2006.01)
*G06G 7/00* (2006.01)
(52) U.S. Cl. .................. 379/88.23; 707/638; 707/802
(58) Field of Classification Search .... 379/88.01–88.23; 707/638, 802
See application file for complete search history.

(56) References Cited

U.S. PATENT DOCUMENTS

| | | | |
|---|---|---|---|
| 7,110,780 B2 | 9/2006 | Bantukul et al. | |
| 7,231,431 B2 | 6/2007 | Sofer et al. | |
| 8,131,678 B1 * | 3/2012 | Moore et al. | 707/638 |
| 2004/0204117 A1 | 10/2004 | Weiner | |
| 2005/0078660 A1 | 4/2005 | Wood | |
| 2008/0080488 A1 | 4/2008 | Marsico | |
| 2010/0273443 A1 * | 10/2010 | Forutanpour et al. | 455/404.1 |
| 2011/0178947 A1 * | 7/2011 | McNutt et al. | 705/346 |
| 2011/0261933 A1 * | 10/2011 | Moore et al. | 379/88.12 |

* cited by examiner

*Primary Examiner* — Davetta W Goins
*Assistant Examiner* — Mohammad Islam
(74) *Attorney, Agent, or Firm* — Husch Blackwell LLP

(57) ABSTRACT

An apparatus for bypassing outgoing voice mail greetings automatically in a broadcast messaging system has a processor in operative communication with an NPANXX database, an NPAC database, an OCN database and a voice mail short code database. The processor is configured to retrieve a telephone number to be called and to identify for the telephone number an OCN from the NPANXX database, identify a current carrier from the OCN database, and to identify a voice mail short code from the voice mail short code database. The processor then associates the current correct voice mail short code with the telephone number to be called.

10 Claims, 4 Drawing Sheets

SYSTEM APPARATUS AND METHOD FOR APPLYING VOICE MAIL SHORT CODES IN A BROADCAST MESSAGE SYSTEM

CROSS-REFERENCE TO RELATED APPLICATIONS

None.

BACKGROUND OF THE INVENTION

1. Field of the Invention

The field of the invention is in telecommunications, particularly broadcast message transmission of a plurality of messages.

2. Related Art

Certain organizations, for example school districts and youth sports leagues, frequently need to send a single message to a plurality of receivers. Such messages may include emergency notices, for example weather related problems like hurricanes. Certain other messages may be non-emergencies but time sensitive nonetheless, such as a scheduling change for a little league game. In order to send such broadcast messages, products and services have been developed for the relevant organizations, such as those offered by the applicant herein, Groupcast LLC.

Some broadcast messaging services send telephone messages in the form of a voicemail through the traditional publicly switched telephone network ("PSTN"). Other services may offer voicemail services through the voice over internet protocol ("VOIP"). Both access the cellular telephone network. In any case, certain hardware structures and standardized protocols must be used and are unavoidable to broadcast messages at all. Furthermore, the limitations and requirements of the telecommunications infrastructure, whether the publicly switched network or the Internet, must be addressed in order to achieve acceptable or advantageous success rates for message deliveries and acceptable or advantageous speed in delivering them.

One of the infrastructure limitations in broadcast messaging is that the message being broadcast is a prerecorded voicemail message that is being delivered by a computer. When the number being called is answered by voicemail system such as on cellular telephones, the outgoing greeting message is also being executed by a computer system. If the broadcast messaging system is programmed to begin playing its broadcast message when the number being called picks up, each call received by a voicemail service will be cut off by the amount of time it takes for the receiving voicemail service to play its outgoing greeting. If the system sending the broadcast message is programmed to wait for the outgoing message to be silent, the broadcast message will begin at the pause that voicemail outgoing greetings use to receive instructions. At this circumstance, the broadcast message will also be cut off by subsequent outgoing greetings if no instructional code is entered. Even in the event that the broadcast message could be programmed to wait for the complete conclusion of the outgoing voicemail greeting, costs increase due to the time needed to listen to the outgoing voicemail greeting and time is wasted that could otherwise be used for completing the call and moving on to the next call.

SUMMARY OF THE INVENTION

The invention is a system, apparatus and method to discover and apply voicemail short codes in an automatic broadcast messaging system. Voicemail short codes or "barge ahead" codes are the numbers or tones that can be entered by a caller to skip the rest of the outgoing greeting of the recipient's voicemail.

In one embodiment, the first seven digits of a ten digit telephone number are used to search the North American Number Plan ("NANP") database for an Operating Company Number ("OCN") to which the number being called has been assigned. A database is searched for the name of the current carrier associated with the OCN. A next database is searched to discover the voicemail short codes or "barge ahead" codes for each carrier. These codes are then associated with the particular number to be called, which association in one embodiment may be stored in a memory. At calling that particular number, then, if the call is received by a voicemail system, the system, apparatus and method of the present invention plays the known voicemail short code, thereby bypassing the outgoing voicemail greeting, and the recorded broadcast message begins thereafter.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

DETAILED DESCRIPTION OF INVENTION

There is a finite supply of 10-digit telephone numbers. To avoid assigning the same number to more than one person, each unique 10-digit telephone number is assigned to telephone service operating companies according to the North American Numbering Plan Administration. Historically, telephone numbers have been assigned to operating companies in blocks of 1,000. The numbers assigned and the companies to which they were assigned are recorded at a Numbering Plan Area and Exchange ("NPANXX") database. Since the deregulation of the telephone industry in the early 1980's, between 5,000-6,000 telephone service operating companies have been assigned blocks of numbers. The operating companies have also been assigned unique Operating Company Numbers ("OCNs").

Later, in response to consumer demand for keeping specific telephone numbers when the consumer moves or obtains a new cellular telephone, a telephone number portability capability was developed by the telecommunications industry. The numbers so moved from a first service providing operating company to another operating company were recorded in a Number Portability database ("NPAC"). The vast majority of numbers recorded in this database are cellular telephone numbers.

Figure 1:
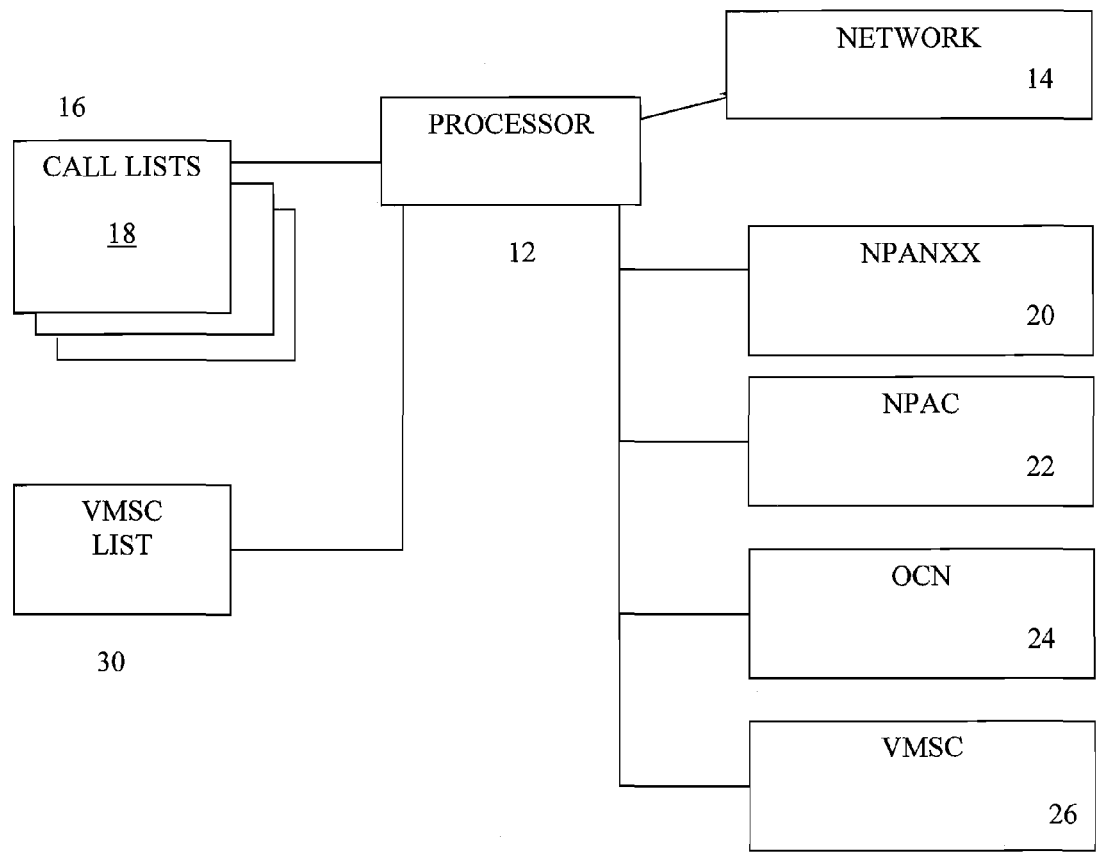
FIG. 1 is a block diagram depicting the components of the voice mail short code apparatus.

Referring to the drawings wherein like reference numbers indicate like elements, FIG. 1 depicts the components of the present invention and their relationship to one another. A processor 12 is in operative communication with a communications network 14 such as either the publicly switched telephone network ("PTSN") or the Internet or the cellular telephone network, or any combination of the three. The processor 12 is also in communication with a database 16 containing call lists 18. The call lists 18 list participants in an organization using the broadcast messaging service, such as parents in a school district, who are to receive broadcast messages on the telephones whose numbers are also listed on the call lists 18. The processor 12 is also in operative communication with an NPANXX database 20, an NPAC database 22, an operating company number database 24 and a voice mail short code database 26. The processor is finally in operative communication with a call list having voice mail short codes associated with the telephone numbers on the list in voice mail short code database 30. The NPANXX database 20, NPAC database 22, operating company number database 24 and voice mail short code database 26 may be maintained on the server of the broadcast messaging service company as depicted, but any or all of such databases may be maintained elsewhere without departing from the scope of the present invention.

Figure 2:
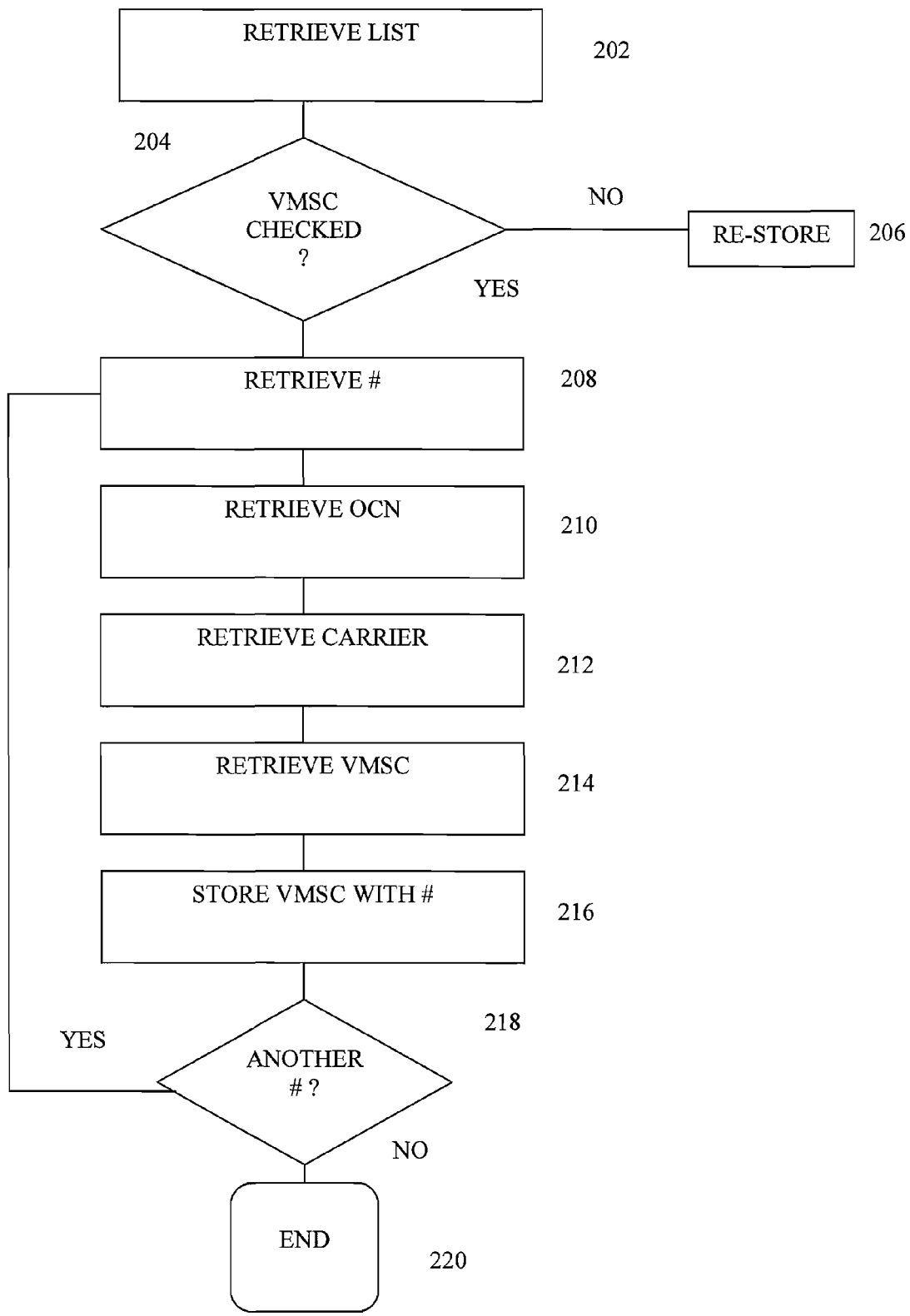
FIG. 2 is a flowchart depicting the voice mail short code process.

In FIG. 2, the routine for looking up the voice mail short codes is depicted. At a first process step 202, a call list 18 is uploaded from the call list database 16. After this retrieve call list step 202, the list 18 is checked to see if voice mail short coding has been selected as an option at step 204. If voice mail short coding has not been selected, the list is restored at step 206 and the routine ends for that list 18. If the voice mail short code capability has been requested, a first telephone number from list 18 is retrieved at step 208. For that number, the operating company number is retrieved at step 210. From the OCN number, the current service provider or carrier is retrieved from database 24 at step 212. When the carrier has been identified, the voice mail short codes are recalled at step 214 from voice mail short code database 26. Thereafter, the voice mail short code for that telephone number is stored in association with that telephone number at step 216. The routine then checks to see if there is a next telephone number on the call list. If yes, the routine returns to step 208 and repeats. If no, the routine ends 220.

Figure 3:
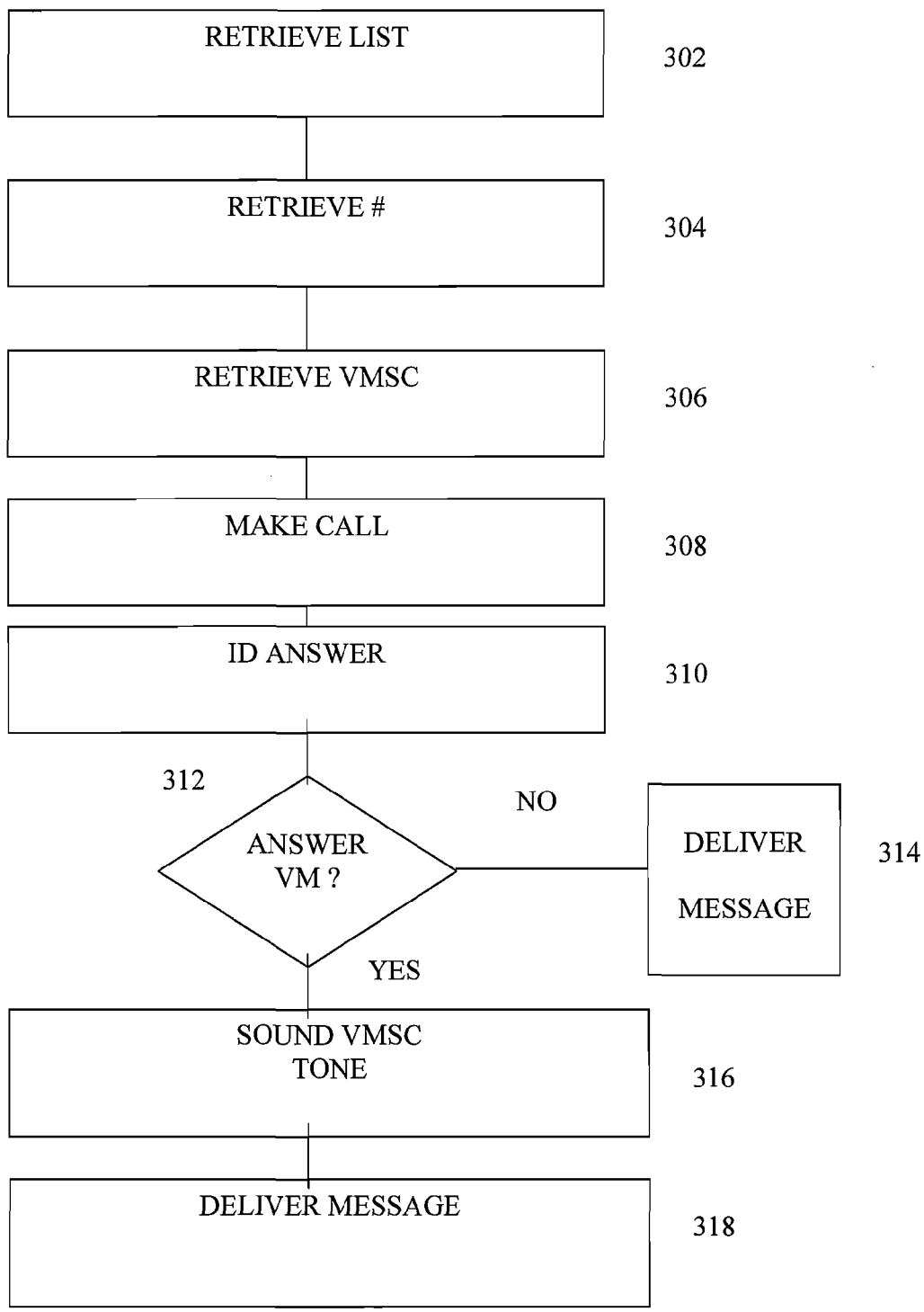
FIG. 3 is a flowchart depicting the call process with the voicemail short code system.

FIG. 3 is a flowchart for the broadcast messaging call routine. At step 302, a call list is retrieved. At step 304, a first telephone number from the call list is retrieved. At step 306, the voice mail short code associated with that telephone number in voice mail short code memory 26 is retrieved. The call is then placed at step 308 and the nature of the answer made to the placement of the call, i.e., a live answer, failed call or voice mail pickup, is identified at step 310 by identification means, which may be automated electronic equipment for distinguishing human from machine answers. At step 312, the routine queries if the answer to the call was by voice mail. If the answer was not voice mail, the message is delivered at step 314 or, alternatively, in the event of a failed call, the failure is recorded in a usage log and the call terminates. If voice mail does answer the call, the voice mail short code tone is applied at step 316 and finally, the message is delivered at step 318.

Figure 4:
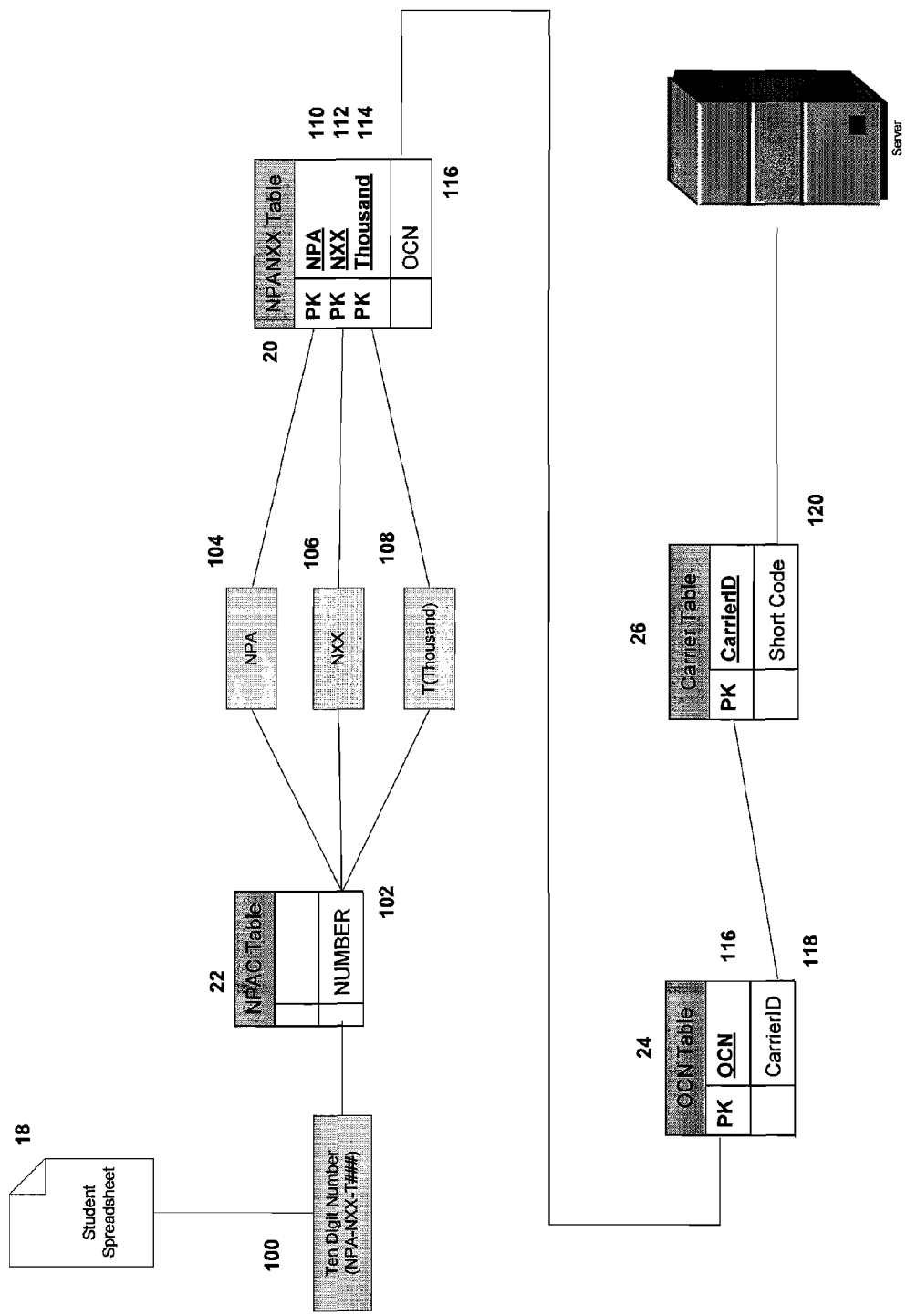
FIG. 4 is a further flowchart depicting the voice mail short code process.

FIG. 4 depicts the detailed routine for finding the voice mail short code for a particular telephone number. The depicted embodiment of the present invention takes each telephone number in order from the provided list 18 of message recipients. For each number 100 the first seven digits, that is, the area code or Number Plan Area "NPA" 104, together with the exchange or "NXX" 106, and the first digit of the thousand designation or "T###" 108, are compared to a Number Portability Administration Center ("NPAC") table 22. Numbers found in the NPAC table, that is, numbers that have been moved, are flagged 102 as cellular telephone numbers, which is the case in the majority of instances. These flagged numbers are then compared to the Numbering Plan Area and Exchange database or "NPANXX" table 20 to discover an OCN which is unique for each telephone number. In the depicted embodiment, this may be done in a recursive fashion, where first the NPA 104 of the number being processed is found in the NPANXX table 20 at 110, then within that area code or NPA the exchanges or NXXs 106 are searched and found at 112, and then finally the thousands category T###108 is searched for and found at 114 within the exchange. Primary keys "PK" may be used to uniquely identify rows in the tables 20, 24 and/or 26 where corresponding to stored data. This process step yields the OCN 116 for the particular number being processed.

It is within the scope of the present invention that the NPAC lookup step 102 and the NPANXX table lookup steps 110-116 may be executed in the depicted order or these steps may be reversed. It is further within the scope of the present invention that the NPAC lookup step 102 be omitted altogether.

Next, the process proceeds to an OCN table 24 stored in a database. The OCN table 24 associates each OCN 116 with a particular current telephone service operator or "carrier" 118. The current carrier may be a company such as AT&T, Sprint operating under its originally assigned OCN. It may also be a current carrier that has purchased other operating companies. Therefore the current carrier may be operating under its own original OCN, and/or a different, old OCN of a purchased company. In either case, an OCN is associated with each individual telephone number. Which current carrier is associated with the particular number being processed is therefore identified at the OCN table look up step. Once the particular current carrier is known, that carrier is looked up in the Carrier Table or voice mail short code database 26, which may or may not be in a separate, associated database. There, the current carrier identification is correlated with the current, functional voice mail short codes 120 for that carrier. At this process step, the particular phone number 100 being processed is associated with the correct short code 120 for bypassing the outgoing voice mail greeting message. The voice mail short code for a given current carrier may in one embodiment be compiled from empirical data. The empirical data may be gathered from call history databases over time, or manually and entered into the voice mail short code database 26.

In one embodiment, this association of a unique telephone number with the current, functioning voice mail short code is stored in a memory 30. By avoiding the outgoing voice mail message, the present process advantageously avoids the message being broadcast being cut off by the outgoing voice mail greeting message, and speeds delivery of all messages. The present invention may alternatively be applied and run as the broadcast message is being executed. In a further alternate embodiment, the voice mail short codes may be generated and saved in association with the corresponding telephone numbers and then updated by running the routine again during a broadcast message.

As various modifications could be made to the exemplary embodiments, as described above with reference to the corresponding illustrations, without departing from the scope of the invention, it is intended that all matter contained in the foregoing description and shown in the accompanying drawings shall be interpreted as illustrative rather than limiting. Thus, the breadth and scope of the present invention should not be limited by any of the above-described exemplary embodiments, but should be defined only in accordance with the following claims appended hereto and their equivalents.

What is claimed is:

1. An apparatus for bypassing outgoing voice mail greetings in a broadcast messaging system comprising:
   a processor;
   said processor being in operative communication with an NPANXX database, an OCN database and a voice mail short code database;
   said processor being configured to retrieve a telephone number to be called and to identify for the telephone number an OCN from said NPANXX database, and to identify a current carrier for the telephone number from said OCN database, and to identify a voice mail short code for the telephone number from said voice mail short code database; and said processor being further configured to associate said voice mail short code with the telephone number to be called;
   said processor being further in operative communication with a NPAC database, said processor being further configured to flag the telephone number to be called as a cellular telephone if the telephone number to be called is found in said NPAC database;
   said processor being further configured to process said NPAC identification step before processing said NPANXX identification step, said OCN identification step, said voice mail short code identification step and said voice mail short code association step;
   said processor being further configured to process said NPANXX identification step, said OCN identification step, said voice mail short code identification step and said voice mail short code association step only if said NPAC identification step flags the telephone number to be called is flagged as a cellular telephone;
   said processor being further configured to retrieve a call list from a call list database, said call list having telephone numbers to be called;
   said processor being further configured to retrieve a telephone number to be called from said retrieved call list;
   said processor being in operative communication with a communications network and being configured to call the retrieved telephone number to be called and to apply the voice mail short code associated with the telephone number called when a voice mail outgoing greeting is detected such that the broadcast message is not cut off by an outgoing voice mail greeting message.

2. The apparatus of claim 1 further comprising said processor being in operative communication with a communications network and being configured to call the telephone number to be called and to apply the voice mail short code associated with the telephone number called when a voice mail outgoing greeting is detected.

3. The apparatus of claim 1 further comprising said voice mail short code database being compiled from empirical data.

4. The apparatus of claim 3 further comprising said empirical data is gathered from call history databases, or manually.

5. The apparatus of claim 3 further comprising said empirical data is gathered from manual discovery.

6. The apparatus of claim 1 further comprising said association of the telephone number with said voice mail short code is stored in a memory.

7. The apparatus of claim 1 further comprising said association of the telephone number with said voice mail short code is stored for a time longer than a duration of the broadcast message in which the telephone number is called.

8. The apparatus of claim 1 further comprising said association of the telephone number with said voice mail short code is executed during the broadcast message in which the telephone number is called.

9. The apparatus of claim 7 further comprising said association of the telephone number with said voice mail short code is updated during the broadcast message in which the telephone number is called.

10. A system for bypassing outgoing voice mail greetings in a broadcast messaging system comprising:
    a processor, said processor being in operative communication with an NPANXX database, an OCN database and a voice mail short code database;
    said processor being further configured to retrieve a call list from a call list database, said call list having a plurality of telephone numbers to be called;
    said processor being further configured to retrieve a telephone number to be called from said retrieved call list;
    said processor being configured to identify for the telephone number to be called an OCN from said NPANXX database, and to identify a current carrier for the telephone number to be called from said OCN database, and to identify a voice mail short code for the telephone number to be called from said voice mail short code database;
    said processor being further configured to associate said voice mail short code with the telephone number to be called;
    said processor further being in operative communication with a communications network and being configured to call the retrieved telephone number to be called and to apply said voice mail short code associated with the telephone number called when a voice mail outgoing greeting is detected such that the broadcast message is not cut off by the outgoing voice mail greeting message.

* * * * *